United States Patent [19]
Pietrogrande, deceased et al.

[11] Patent Number: 5,381,634
[45] Date of Patent: Jan. 17, 1995

[54] COVERING STRUCTURE PARTICULARLY FOR SURFACES HAVING A MARKED LONGITUDINAL EXTENSION

[75] Inventors: Stefano Pietrogrande, deceased, late of Rome, by Daniela Pietrogrande née Formenti, heir; Marco Attanasio, Bari; Paolo Bisogni; Sandro Lomoro, both of Rome, all of Italy

[73] Assignee: I.C.P.-Industria Componenti Prefabbricati S.r.l., Bari, Italy

[21] Appl. No.: 989,668

[22] Filed: Dec. 14, 1992

[30] Foreign Application Priority Data

Dec. 17, 1991 [IT] Italy .............. MI91 A 003371

[51] Int. Cl.6 .................................. E04B 1/32
[52] U.S. Cl. .................................. 52/86; 52/63; 52/71; 52/641; 135/138; 4/498; 4/499; 4/503
[58] Field of Search ............ 52/63, 86, 639, 641, 52/643, 64, 71; 135/102, 103, 105, 106, 110, 116, 906; 4/495, 498, 499, 500, 501, 502, 503

[56] References Cited

U.S. PATENT DOCUMENTS

| | | | |
|---|---|---|---|
| 2,461,916 | 2/1949 | Omar | 52/71 |
| 3,062,340 | 11/1962 | Hunnebeck | 52/641 |
| 3,633,326 | 1/1972 | McKnight et al. | 52/86 |
| 3,749,107 | 7/1973 | Laberge | 135/102 |
| 3,780,477 | 12/1973 | Sprung, Jr. | 52/63 X |
| 3,855,643 | 12/1974 | Sanford et al. | 52/86 X |
| 3,909,993 | 10/1975 | Huddle | 52/63 |
| 4,280,306 | 7/1981 | Milinic | 52/86 X |
| 4,347,690 | 9/1982 | Wallace, Jr. | |
| 4,593,710 | 6/1986 | Stafford et al. | 52/86 X |
| 4,885,877 | 12/1989 | Hunt et al. | 52/63 X |

FOREIGN PATENT DOCUMENTS

| | | | |
|---|---|---|---|
| 373006 | 12/1983 | Austria . | |
| 1071238 | 8/1954 | France | 52/86 |
| 2053412 | 6/1971 | Germany . | |
| 8111339 | 9/1987 | Germany . | |
| 772541 | 4/1957 | United Kingdom | 52/64 |

Primary Examiner—Carl D. Friedman
Assistant Examiner—Kevin D. Wilkens
Attorney, Agent, or Firm—Guido Modiano; Albert Josif; Daniel O'Byrne

[57] ABSTRACT

The covering structure has retention members for location beside a surface to be covered. A suspension member, having a plurality of mutually hinged segments, is pivotally connected at its ends to the retention members. Locking pins are provided for locking the segments to each other and to the retention members. A covering membrane is coupled to the segments by suspension members.

16 Claims, 4 Drawing Sheets

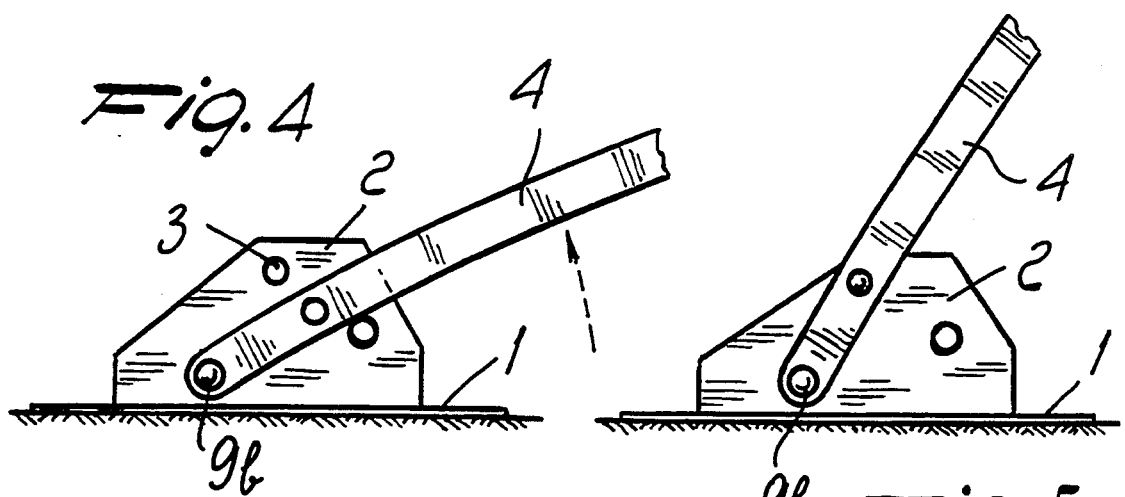
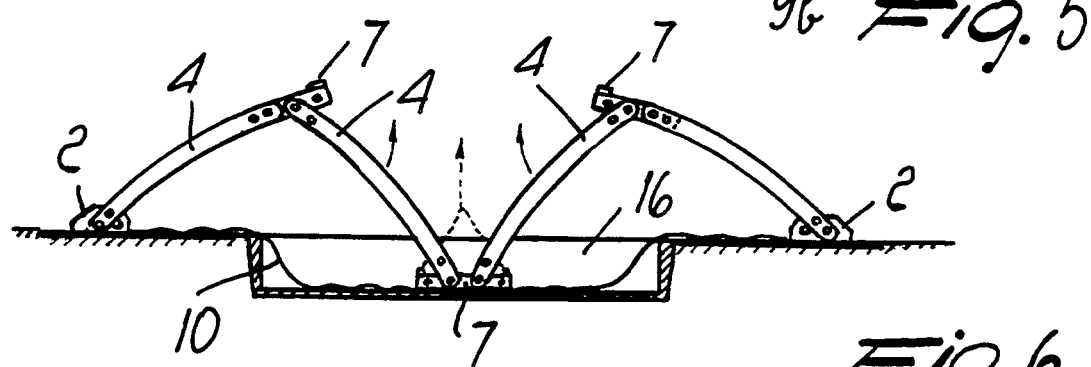
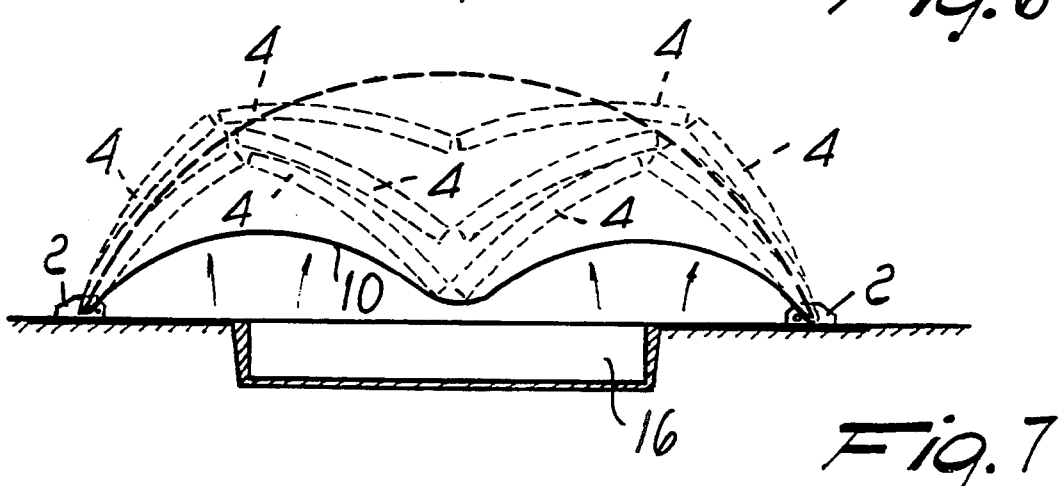
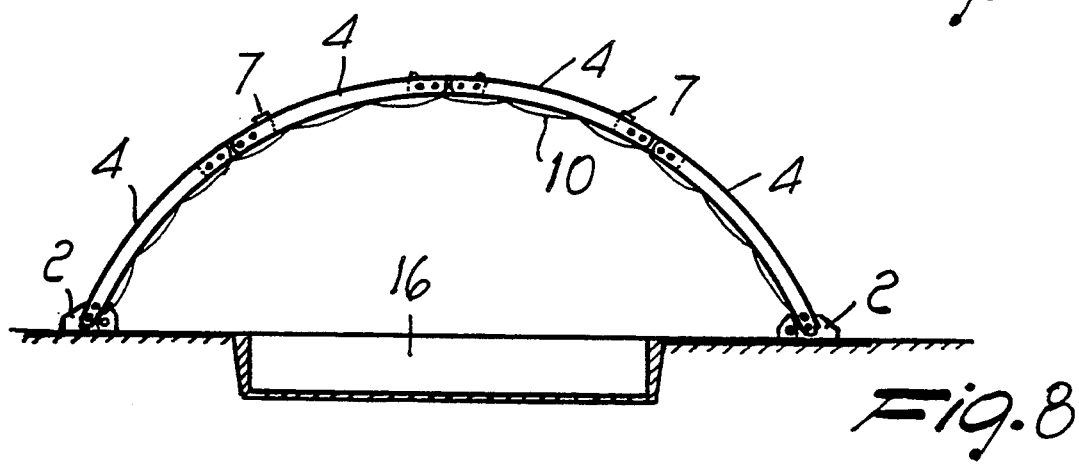

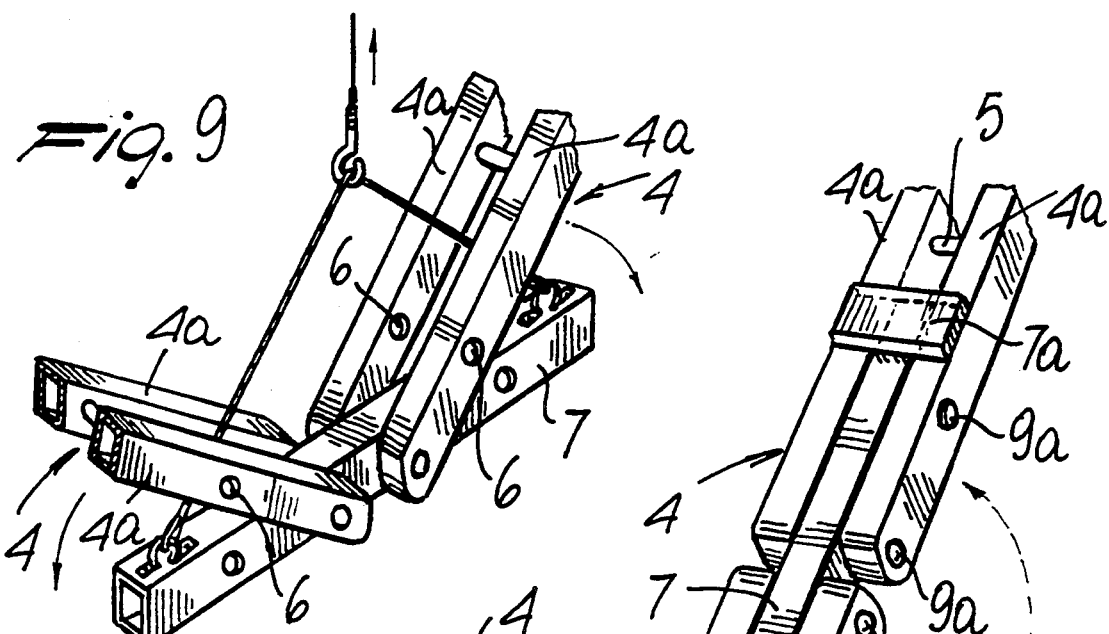
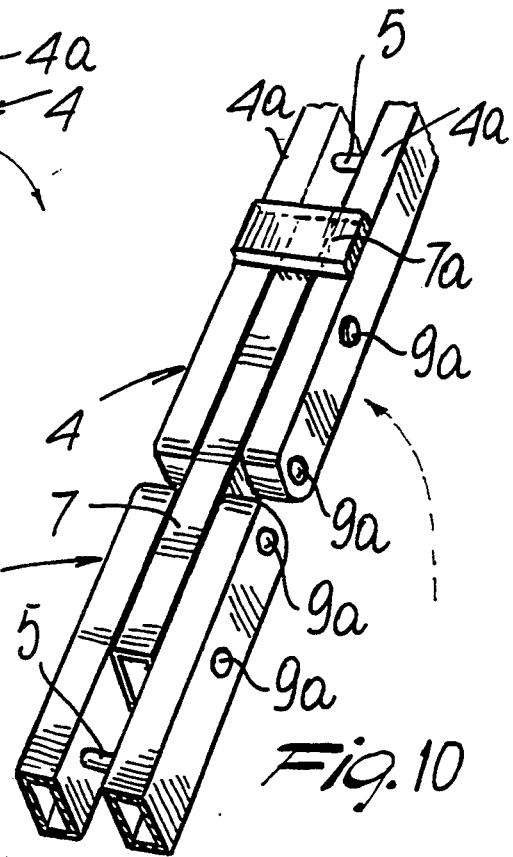
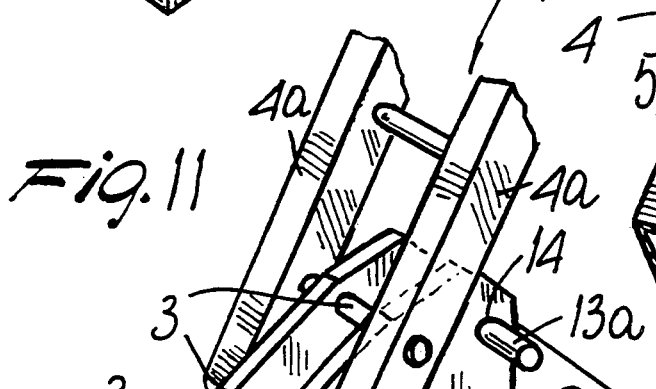
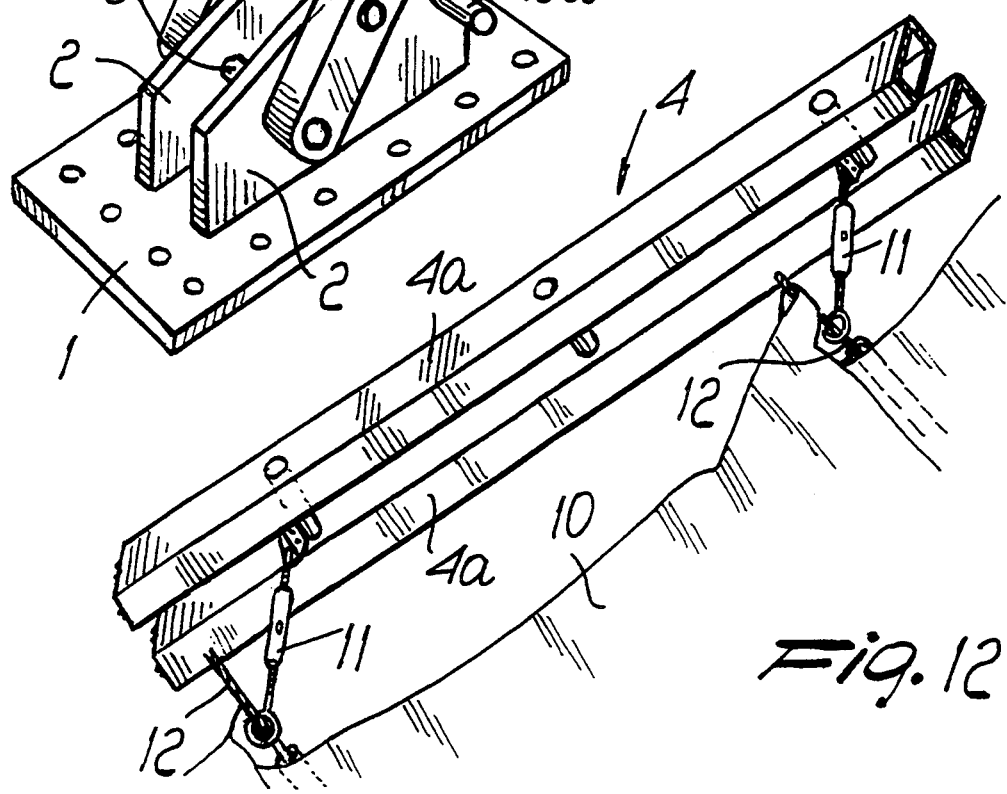

COVERING STRUCTURE PARTICULARLY FOR SURFACES HAVING A MARKED LONGITUDINAL EXTENSION

BACKGROUND OF THE INVENTION

The present invention relates to a covering structure particularly for surfaces having a marked longitudinal extension.

As is known, covering structures which can be installed starting from a horizontal plane having no depressions and the like are used to cover surfaces which are used as playing fields, tennis courts, hand-ball fields and the like.

However, for pools used for swimming, water-polo or for diving, coverings used for playing fields which have flat surfaces, such as those mentioned above, have considerable difficulties in installation, since there are considerable level differences or rather considerable depressions which make the installation of said covering particularly expensive and complicated.

In particular, in the case of coverings supported by supporting elements, such as rods assembled on the ground to produce geodetic structures and the like, it is practically impossible to perform assembly due to the lack of a flat surface on which the various rods which merge at the various nodes can be prepared.

SUMMARY OF THE INVENTION

The aim of the present invention is to eliminate or substantially reduce the problems described above by providing a covering structure particularly for surfaces having a marked longitudinal extension, which can be assembled both on flat surfaces and on surfaces having more or less marked irregularities.

Within the scope of the above aim, an object of the present invention is to provide a covering structure which can be easily assembled from a limited number of standardizable components.

Not least object of the present invention is to provide a covering structure which is highly reliable, relatively easy to manufacture and at competitive costs.

This aim, the objects mentioned and others which will become apparent hereinafter are achieved by a covering structure particularly for surfaces having a marked longitudinal extension, characterized in that it comprises retention means arranged and fixed along sides of said surfaces which have an elongated longitudinal extension, suspension means having an elongated longitudinal extension being rotationally retained to said retention means, said suspension means being mutually rotationally retained by virtue of pivoting means, said suspension means being rigidly associable with said pivoting means and with said retention means by means of reversible locking means, said retention, suspension, pivoting and locking means being suitable, in mutual cooperation, to raise and support surface covering means.

BRIEF DESCRIPTION OF THE DRAWINGS

Further characteristics and advantages of the invention will become apparent from the description of a preferred but not exclusive embodiment of a covering structure particularly for covering surfaces having a marked longitudinal extension, according to the invention, illustrated only by way of non-limitative example in the accompanying drawings, wherein:

FIG. 4 is a lateral elevation view of retention means fixed to a flat surface and of a portion of suspension means which are pivoted on the retention means;

FIG. 5 is a lateral elevation view of retention means fixed to a flat surface and of a portion of suspension means retained and installed;

FIG. 6 is a lateral elevation view which exemplifies the situation at the end of the assembly of the suspension structure;

FIG. 7 is a lateral elevation view which exemplifies the erection of the suspension structure;

FIG. 8 is a lateral elevation view which exemplifies the final installation of the suspension structure;

FIG. 9 is a perspective view of pivoting means engaged with suspension means;

FIG. 10 is a perspective view of a pivoting means which locks neighbouring suspension means;

FIG. 11 is a perspective view of the retention means with suspension means locked and installed;

FIG. 12 is a perspective view of the suspension of covering means from said suspension means;

DESCRIPTION OF THE PREFERRED EMBODIMENTS

With reference to the above figures, a covering structure particularly for surfaces having a marked longitudinal extension comprises retention means, each of which comprises a stationary ground-resting plate 1 which has protrusions 2; each protrusion is provided with through holes 3 which are arranged along preset axes. Each series of coaxial through holes 3 can contain reversible locking means.

Figure 1:
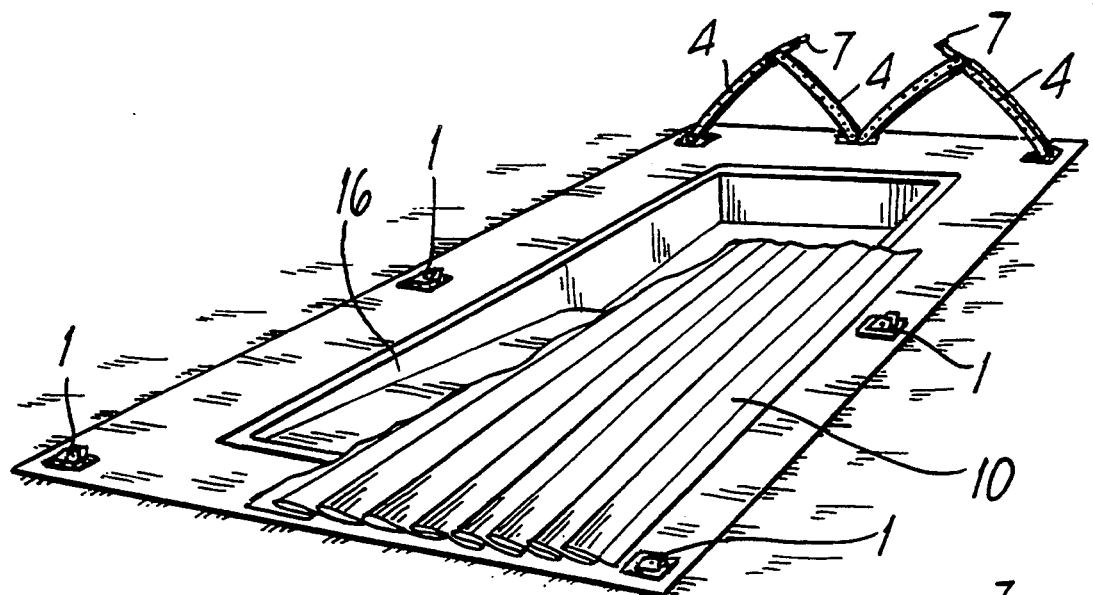
FIG. 1 is a perspective view of a structure according to the invention, during assembly for example over a swimming pool.
Figure 2:
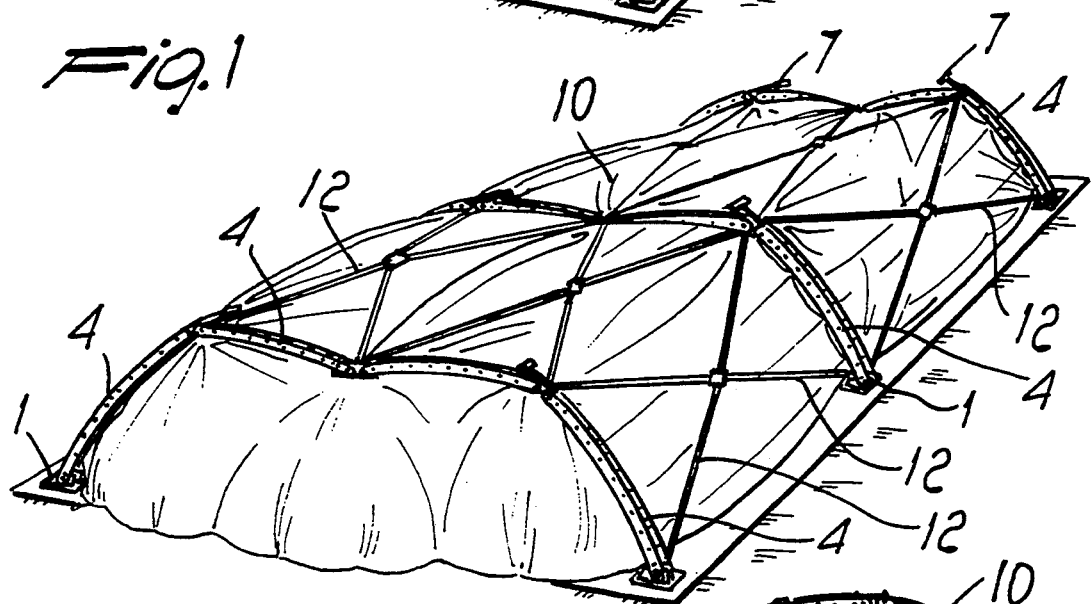
FIG. 2 is a perspective view of the structure according to the invention, during erection over a swimming pool.
Figure 3:
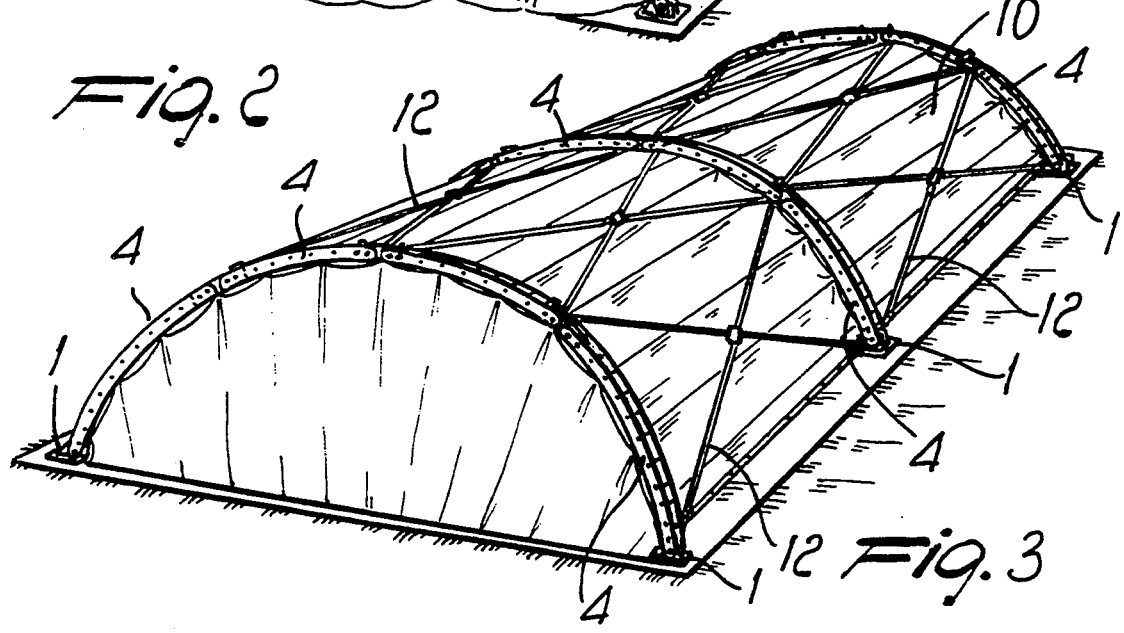
FIG. 3 is a perspective view of the structure according to the invention, installed over a swimming pool.
Figure 13:
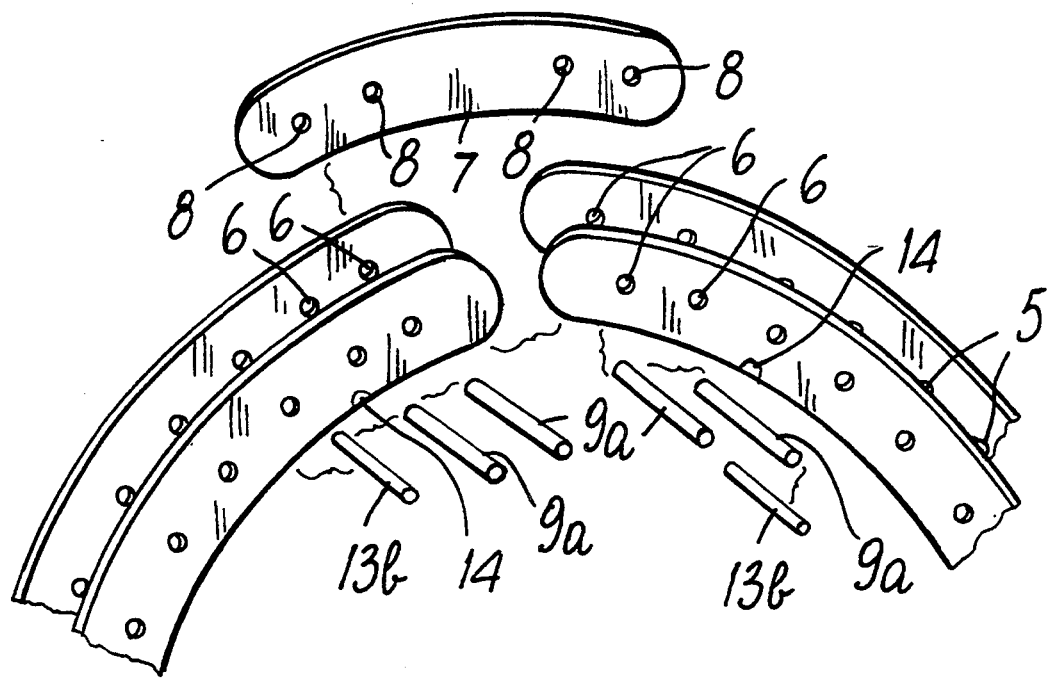
FIG. 13 is an exploded perspective view of the pivoting between the pivoting means and suspension means.

Suspension means are connected to the retention means and comprise a plurality of segments 4 which are mutually hinged; each segment 4 is composed of a pair of members 4a which are mutually joined by means of cross-members 5 which are straight or shaped like an arc of a circumference, i.e. have a constant radius of curvature, and have, proximate to their respective longitudinal ends, at least one pair of holes 6 in which reversible locking means are accommodated. As clearly illustrated in FIGS. 2 and 3, the plates 1 and the segments 4 together define a plurality of arched frames.

The pivoting means comprise hinges 7 which extend longitudinally and have the same radius of curvature as the members 4a; each hinge is inserted within adjacent pairs of members.

Each hinge has, on its respective terminal ends, holes which are arranged complementarily to the holes 6 present on the ends of the members 4.

As more clearly illustrated in FIGS. 9 and 10, the hinges 7 have different uses according to the different positions in which they are arranged in the structure according to the invention.

In fact, if they are used as head hinges, FIG. 9, they are rotationally retained to both of the segments 4 which are adjacent to the hinge 7, so as to allow for example the mechanical lifting of the structure according to the invention.

If instead, FIG. 10, the hinges 7 are used as pivoting means different from a head hinge, they are completely fixed to one segment 4 and are hinged to the other segment 4 which is adjacent thereto. In this case, furthermore, an abutment 7a is fixed on the hinge 7, engages the members 4a and limits the movement of said hinge, preventing its negative bending.

The reversible locking means comprise locking pins which are designated by the reference numeral 9a and enter the locking holes 8 of the hinges 7, whether of the head type or not, to fix them to the respective segments 4, entering the holes 6 provided on the members 4a.

Pins 9b instead fix to the protrusions 2 the segments 4 which are adjacent to the plates 1, entering the holes 3 of the protrusions and the holes 6 of the segment 4.

The covering means comprise a membrane 10 which can be coupled to the members 4a by means of suspension members or ropes 11 fixed to the membrane 10 by means of engagement cables 12 fixed to the crosspieces 5.

Each group of protrusions 2 and each pair of members 4a has means for limiting the negative bending of the members during lifting; said means comprise a respective bar 13a inserted within limiting holes 14 defined on the protrusions 2 and a respective bar 13b inserted in limiting holes 15 defined on the members 4a.

The rotational limiting performed on the hinges 7 by the bars 13b occurs both on head hinges and on the other hinges, in order to eliminate the possibility of negative bending of the pivotal connections which can compromise the correct lifting of the structure according to the invention.

Assembly is as follows, with reference to FIGS. 1 to 3 and 6 to 8: a plurality of plates 1 is arranged and fixed to the ground at the perimeter or sides of an area to be covered, for example, a swimming pool 16; respective pairs of members 4a are subsequently retained to said plates. The covering membrane 10 is spread in the swimming pool. Meanwhile, respective hinges 7 are fixed to segments 4 of members; pairs of members 4 are fixed to said hinges, so that they can rotate angularly, until the required dimensions are reached, i.e. a number of segments such as to raise the membrane 10 by the required height. Then the membrane is anchored to the respective members with the cables 12 to the suspension members 11.

Two different methods can be used to lift the device; the first one is lifting, by means of cranes (not shown), of the uppermost hinges of the device, whereas the second one, which is usually adopted, provides for the pressurized inflation of the membrane 10 with compressed air in order to move into position said membrane, which simultaneously raises the supporting frame. These methods can also be used simultaneously.

Figure 14:
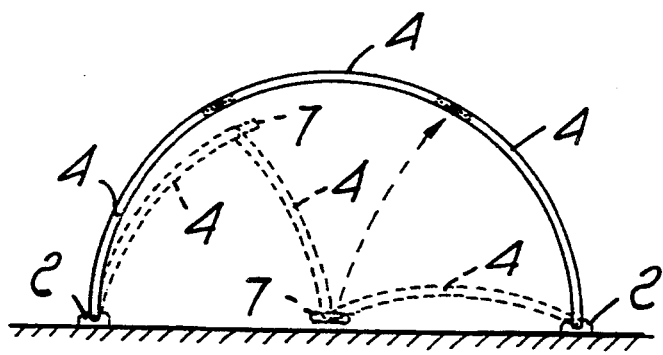
FIG. 14 is a lateral elevation view of a first embodiment of the structure according to the invention.
Figure 15:
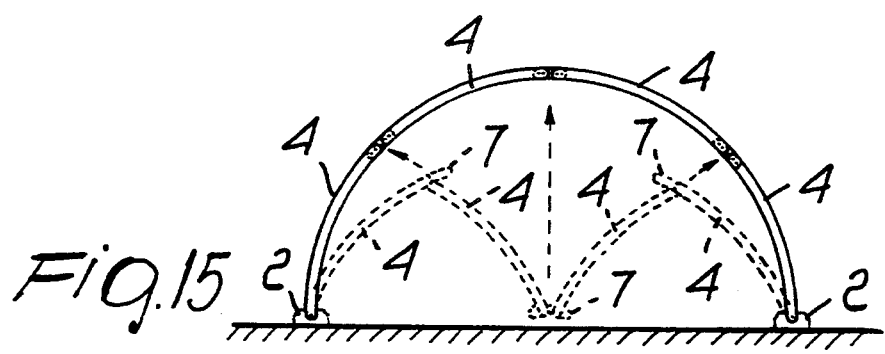
FIG. 15 is a lateral elevation view of a second embodiment of the structure according to the invention.
Figure 16:
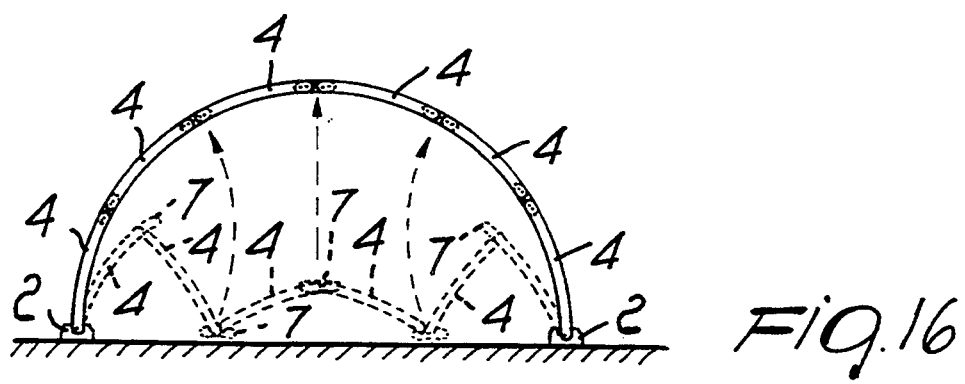
FIG. 16 is a lateral elevation view of a third embodiment of the structure according to the invention.

FIGS. 14, 15 and 16 furthermore illustrate some possible embodiments which can be produced with elements of the same type, i.e. respectively with three pairs of members and four hinges, with four pairs of members and five hinges, and with six pairs of members and seven hinges.

It has been observed that the present invention achieves the intended aim and objects, providing a covering device which can meet requirements for the seasonal or permanent covering of surfaces which have even considerable level differences, such as swimming pools and the like.

The invention thus conceived is susceptible to numerous modifications and variations, all of which are within the scope of the inventive concept. All the details may furthermore be replaced with other technically equivalent elements.

In practice, the materials employed, as well as the dimensions, may be any according to the requirements.

It is claimed:

1. Covering structure comprising a plurality of arched frames (1,4), and a covering membrane (10) connected to said arched frames (1, 4), wherein each of said arched frames comprises;

a pair of stationary retention plates (1), said pair of plates (1) being fixable to the ground at a perimeter of an area to be covered (16);

at least three pivotally interconnected frame segments (4), at least two of said frame segments (4) being pivotally connected to said pair of stationary ground resting retention plates (1);

first locking means (8, 9a) for preventing relative pivotal movement between mutually adjacent frame segments (4);

second locking means (3, 9b) for preventing relative pivotal movement between said frame segments (4) and said stationary ground-resting retention plates (1);

suspension members (11) connected to said covering membrane (10), and;

engagement members (12) connecting said suspension members (11) to said frame segments (4), wherein said frame segments 94) are mutually interconnected by pivoting means (7), said pivoting means (7) comprising hinge members (7) interposed between said mutually adjacent frame segments (4), said covering structure further comprising at least two holes (6) formed proximate to each longitudinal end of each of said frame segments (4) and wherein said first locking means (8, 9a) for preventing relative pivotal movement between said mutually adjacent frame segments (4) comprise at least four locking holes (8) formed in said hinge members (7), and at least four locking pins (9a) engaging said locking holes (8) and said at least two holes (6) formed proximate to a longitudinal end of two adjacent frame segments (4).

2. Covering structure according to claim 1, wherein said retention plates (1) define protrusions (2), and wherein said second locking means (3, 9b) comprise;

at least one pair of coaxial through holes (3) formed in said protrusions (2), and;

at least two pins (9b) engaging said pair of coaxial through holes (3) and said at least two holes (6) formed in one of said frame segments (4), proximate to a longitudinal end thereof located adjacent said protrusions.

3. Covering structure according to claim 1, wherein each of said arched frames (1, 4) comprises six frame segments (4) mutually pivotally interconnected by five hinge members (7).

4. Covering structure according to claim 1, wherein each of said frame segments (4) comprises a pair of members (4a), and a plurality of cross-members (5) interconnecting said members (4).

5. Covering structure according to claim 4, wherein said engagement members (12) are connected to said cross-members (5).

6. Covering structure comprising a plurality of arched frames (1, 4), and a covering membrane (10) connected to said arched frames (1, 4), wherein each of said arched frames comprises;
  a pair of stationary retention plates (1), said pair of plates (1) being fixable to the ground at a perimeter of an area to be covered (16);
  at least three pivotally interconnected frame segments (4), at least two of said frame segments (4) being pivotally connected to said pair of stationary ground resting retention plates (1);
  first locking means (8, 9a) for selectively preventing relative pivotal movement between mutually adjacent frame segments (4);
  second locking means (3, 9b) for selectively preventing relative pivotal movement between said frame segments (4) and said stationary ground-resting retention plates (1);
  suspension members (11) connected to said covering membrane (10), and;
  engagement members (12) connecting said suspension members (11) to said frame segments (4),
  wherein each of said at least three frame segments (4) comprises a pair of members (4a), and a plurality of cross-members (5) interconnecting said pair of members (4a), and
  wherein said frame segments (4) are mutually interconnected by hinge members (7), said hinge members (7) being interposed between said mutually adjacent frame segments (4).

7. Covering structure according to claim 6, further comprising at least two holes (6) formed proximate to each longitudinal end of each of said frame segments (4) and wherein said first locking means (8, 9a) for selectively preventing relative pivotal movement between said mutually adjacent frame segments (4) comprise at least four locking holes (8) formed in said hinge members (7), and at least four locking pins (9a) engaging said locking holes (8) and said at least two holes (6) formed proximate to a longitudinal end of two adjacent frame segments (4).

8. Covering structure according to claim 6, wherein said retention plates (1) define protrusions (2), and wherein said second locking means (3, 9b) comprise;
  at least one pair of coaxial through holes (3) formed in said protrusions (2),
  at least two holes (6) formed in one of said frame segments (4), proximate to a longitudinal end thereof located adjacent said protrusions (2), and;
  at least two pins (9b) engaging said pair of coaxial through holes (3) and said at least two holes (6).

9. Covering structure according to claim 6, wherein said engagement members (12) are connected to said cross-members (5).

10. Covering structure according to claim 6, wherein each of said arched frames (1, 4) defines a constant radius of curvature.

11. Covering structure according to claim 6, wherein each of said arched frames (1, 4) comprises four frame segments (4) mutually pivotally interconnected by three hinge members (7).

12. Covering structure according to claim 6, wherein each of said arched frames (1, 4) comprises six frame segments (4) mutually pivotally interconnected by five hinge members (7).

13. Covering structure comprising a plurality of arched frames (1, 4), and a covering membrane (10) connected to said arched frames (1, 4), wherein each of said arched frames comprises;
  a pair of stationary retention plates (1), said pair of plates (1) being fixable to the ground at a perimeter of an area to be covered (16);
  at least three pivotally interconnected frame segments (4), at least two of said frame segments (4) being pivotally connected to said pair of stationary ground resting retention plates (1);
  first locking means (8, 9a) for selectively preventing relative pivotal movement between mutually adjacent frame segments (4);
  second locking means (3, 9b) for selectively preventing relative pivotal movement between said frame segments (4) and said stationary ground-resting retention plates (1);
  suspension members (11) connected to said covering membrane (10), and;
  engagement members (12) connecting said suspension members (11) to said frame segments (4),
  wherein said frame segments (4) are mutually interconnected by pivoting means (7), said pivoting means (7) comprising hinge members (7) interposed between said mutually adjacent frame segments (4),
  said covering structure further comprising at least two holes (6) formed proximate to each longitudinal end of each of said frame segments (4) and wherein said first locking means (8, 9a) for selectively preventing relative pivotal movement between said mutually adjacent frame segments (4) comprise at least four locking holes (8) formed in said hinge members (7), and at least four locking pins (9a) engaging said locking holes (8) and said at least two holes (6) formed proximate to a longitudinal end of two adjacent frame segments (4),
  wherein said retention plates (1) define protrusions (2), and wherein said second locking means (3, 9b) comprise;
  at least one pair of coaxial through holes (3) formed in said protrusions (2), and;
  at least two pins (9b) engaging said pair of coaxial through holes (3) and said at least two holes (6) formed in one of said frame segments (4), proximate to a longitudinal end thereof located adjacent said protrusions.

14. Covering structure according to claim 13, wherein each of said arched frames (1, 4) defines a constant radius of curvature.

15. Covering structure according to claim 13, wherein each of said arched frames (1, 4) comprises four frame segments (4) mutually pivotally interconnected by three hinge members (7).

16. Covering structure according to claim 13, wherein each of said arched frames (1, 4) comprises six frame segments (4) mutually pivotally interconnected by five hinge members (7).

* * * * *